United States Patent [19]

Green et al.

[11] Patent Number: 4,530,592

[45] Date of Patent: Jul. 23, 1985

[54] REGISTRATION MECHANISM FOR A MULTIMAGNIFICATION REPRODUCTION APPARATUS

[75] Inventors: Frederick A. Green, Fairport; Frederick A. Seedhouse, Webster, both of N.Y.

[73] Assignee: Xerox Corporation, Stamford, Conn.

[21] Appl. No.: 477,557

[22] Filed: Mar. 21, 1983

[51] Int. Cl.[3] .................... G03G 15/00; G03B 27/72; G03B 27/52

[52] U.S. Cl. .......................................... 355/11; 355/8; 355/55; 355/70; 355/71; 430/59

[58] Field of Search .............. 362/97; 315/151, 241 P, 315/241 R; 318/557, 558; 350/266, 314, 519, 520, 521, 522, 560, 570, 575; 354/296, 400, 410; 355/8, 11, 35, 36, 37, 55, 57, 60, 67, 68, 70, 71, 3, 51, 61; 430/56-60, 70, 96

[56] References Cited

U.S. PATENT DOCUMENTS

| | | | |
|---|---|---|---|
| 3,476,478 | 11/1969 | Rees, Jr. | 355/55 |
| 3,777,135 | 12/1973 | Rees | 355/70 X |
| 4,093,374 | 6/1978 | Zucker et al. | 355/58 X |
| 4,105,327 | 8/1978 | Gibson et al. | 355/59 |
| 4,116,554 | 9/1978 | Libby et al. | 355/11 |
| 4,244,649 | 1/1981 | Rees et al. | 355/61 |
| 4,265,990 | 5/1981 | Stolka et al. | 430/59 |
| 4,272,188 | 6/1981 | Lehman et al. | 355/68 |
| 4,298,275 | 11/1981 | Critchlow et al. | 355/71 |
| 4,316,668 | 2/1982 | Miller | 355/55 |
| 4,386,843 | 6/1983 | Seedhouse | 355/57 X |
| 4,466,734 | 8/1984 | Rees | 355/58 |

*Primary Examiner*—A. T. Grimley
*Assistant Examiner*—Terry Flower

[57] ABSTRACT

A flash exposure optical imaging system is provided which includes a light housing having a movable top and bottom surface. The top surface contains a document platen, the bottom surface a fixed, wide-angle projection lens. These surfaces are vertically translated past a fixed, central housing wall to vary the system conjugate in response to changes in magnification. In a preferred embodiment, a pair of football shaped cams are rotated in response to position signals from a controller initiated by a magnification change. A pair of T-bars and linkage mechanisms are associated with these cams and their motion provides simultaneous vertical motions to the top and bottom housing surfaces, respectively. During the vertical excursion of the floor assembly, an additional horizontal motion is imparted to the lens so as to maintain correct corner registration of the document at the image plane.

2 Claims, 8 Drawing Figures

1.55

1.0X

.647 X

REGISTRATION MECHANISM FOR A MULTIMAGNIFICATION REPRODUCTION APPARATUS

BACKGROUND AND PRIOR ART

The present invention relates to an optical illumination and imaging system for a reproduction device and, and more particularly, to a flash exposure system which utilizes a wide-angle, fixed lens and an integrating cavity light housing having a movable platen and floor arrangement to enable reduction and enlargement modes of operation.

Imaging systems which produce reduced or enlarged document images using conventional scanning optics are known in the art. A machine currently sold by the Minolta Co. called the "Minolta EP 710" utilizes an optical system which has a variable scan speed coordinated to the movement of the projection lens. The lens is translated towards or away from the imaging surface with the scanning speed and folding mirror position adjusted to maintain correct object-to-image distances. A disadvantage with this type of prior art system wherein a stationary document is scanned, typically by a moving lamp/mirror arrangement, is that output limitations are imposed by the scan and return-to-scan time requirements. As demands for faster copying and duplicating have increased, these conventional machines which scan documents in incremental fashion to provide a flowing image on a xerographic drum have proved inadequate. New high speed techniques have evolved which utilize flash exposure of an entire document (full-frame exposure) and the arrangement of a moving photoconductor in a flat condition at the instant of exposure.

One example of a high speed, multi-magnification machine is the Xerox 9200 copier/duplicator. This machine utilizes a flash illumination system wherein a relatively narrow half angle (~17°) lens projects a document image along a folded optical path onto a flat photoreceptor. Besides the 1X reproduction mode, the 9200 has reduction modes in which the lens is translated towards the imaging plane and a plurality of add-lenses are moved into the optical path to maintain proper focus.

Another example of a full-frame flash system having reduction capabilities is that disclosed in U.S. Pat. No. 4,116,554. In this system, a magnification capability is enabled by utilizing a combined lens and mirror translation.

In copending U.S. Application Ser. No. 372,581, a full-frame flash system is disclosed wherein a reduction capability is enabled by translating the document platen away from the lens while the lens is simultaneously moved towards the image plane.

Heretofore, a flask exposure system having both reduction and enlargement capabilities, has not been realized although the advantages thereof are readily apparent. The problems which must be solved in enabling a multi-magnification flash system including maintaining an adequate illumination level at the document platen over all modes of operation and maintaining required document-to-photoreceptor distances during movement of the projection lens. Applicants have solved these problems by providing a simple compact "straight through" system (e.g. no folding mirrors), and have set the projection lens in a movable floor of a light housing. A portion of the platen housing wall, having an illumination lamp secured thereto, is also movable in conjunction with the floor/lens movement, the combined movement adapted to provide required image magnification at the photoreceptor while yet maintaining total object-to-image conjugate and document corner registration. The imaging system provides a continuous magnification capability of 0.647X through 1.55X while according to the present invention, maintaining corner registration of the document to be copied.

More particularly the invention is directed to an imaging system for providing, at an image plane, reduced or enlarged images of a document lying in an object plane comprising:

an enclosed light housing which includes a vertically translatable transparent platen assembly forming the top surface thereof and a vertically translatable floor assembly forming the bottom surface thereof, a projection lens mounted in an aperture of said floor assembly, means for simultaneously changing the position of said platen assembly and said floor assembly in response to a particular magnification selection, flash illumination means within said housing to provide substantially uniform illumination of said platen; and lens registration means for providing a horizontal component of motion to said lens simultaneously with said vertical lens movement to maintain corner registration of said document at the imaging plane.

DRAWINGS

Figure 4C:
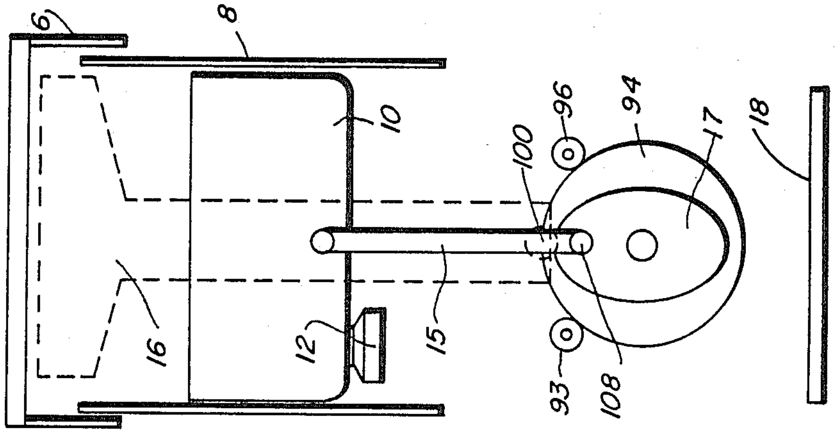
Figure 4B:
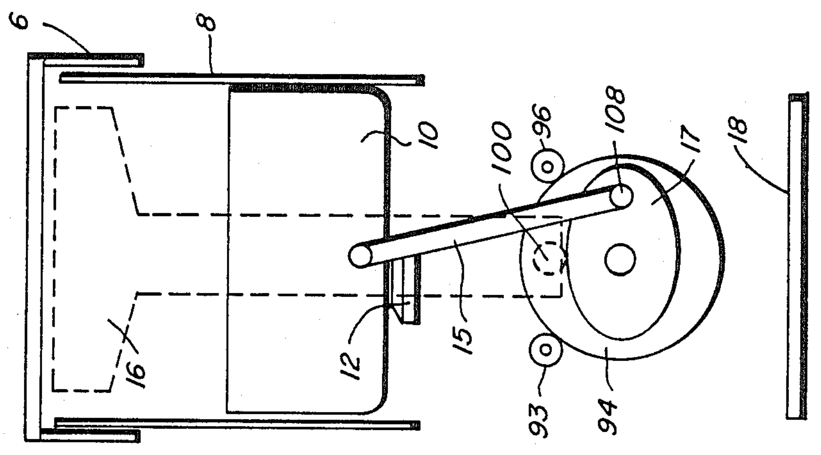
Figure 4A:
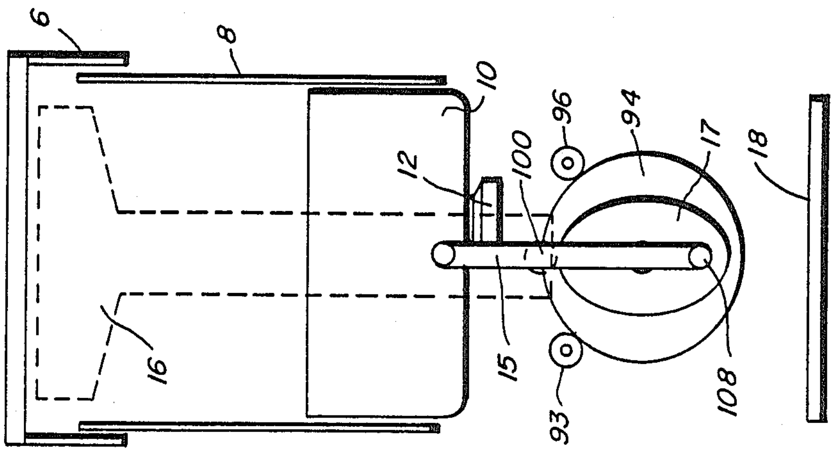

FIGS. 4*a*, 4*b* and 4*c* are schematic views of one side of the light housing showing the football cam orientation for various magnification positions.

Figure 5:
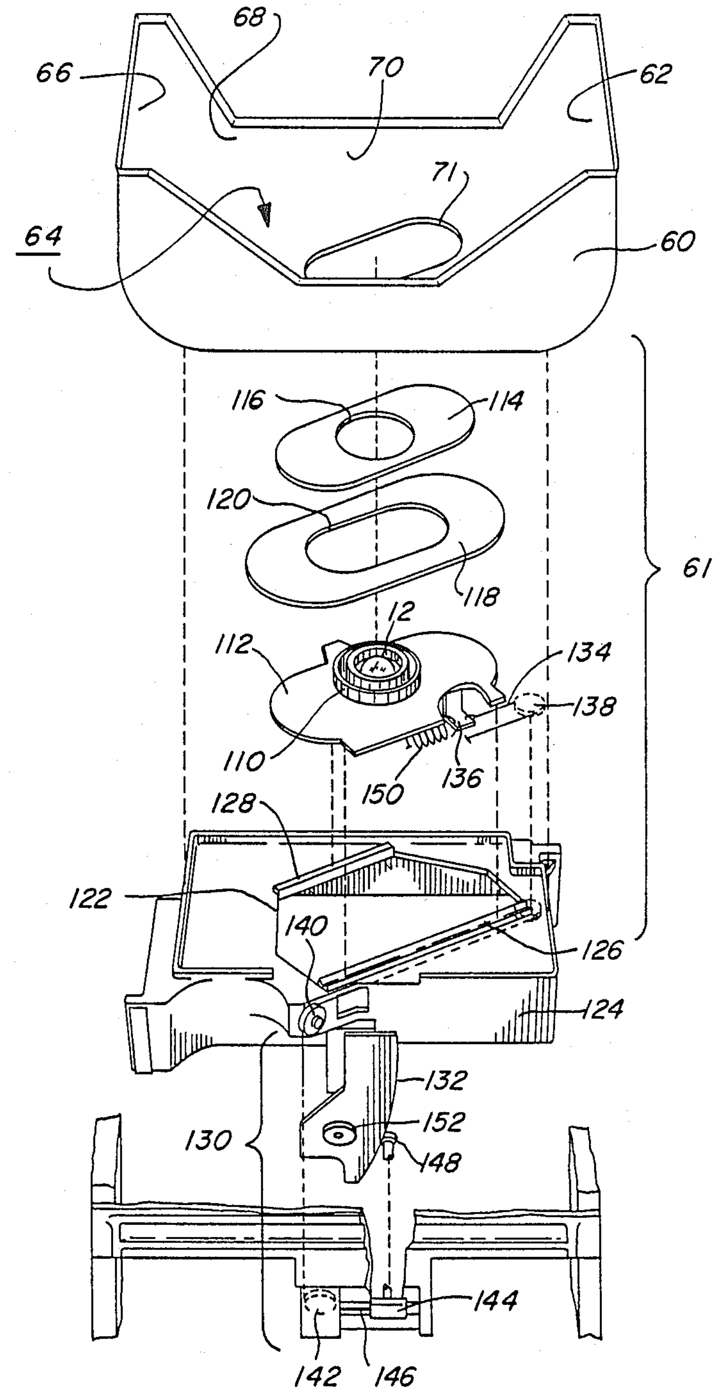

FIG. 5 shows an exploded view of the housing floor and the lens carriage components.

Figure 6:
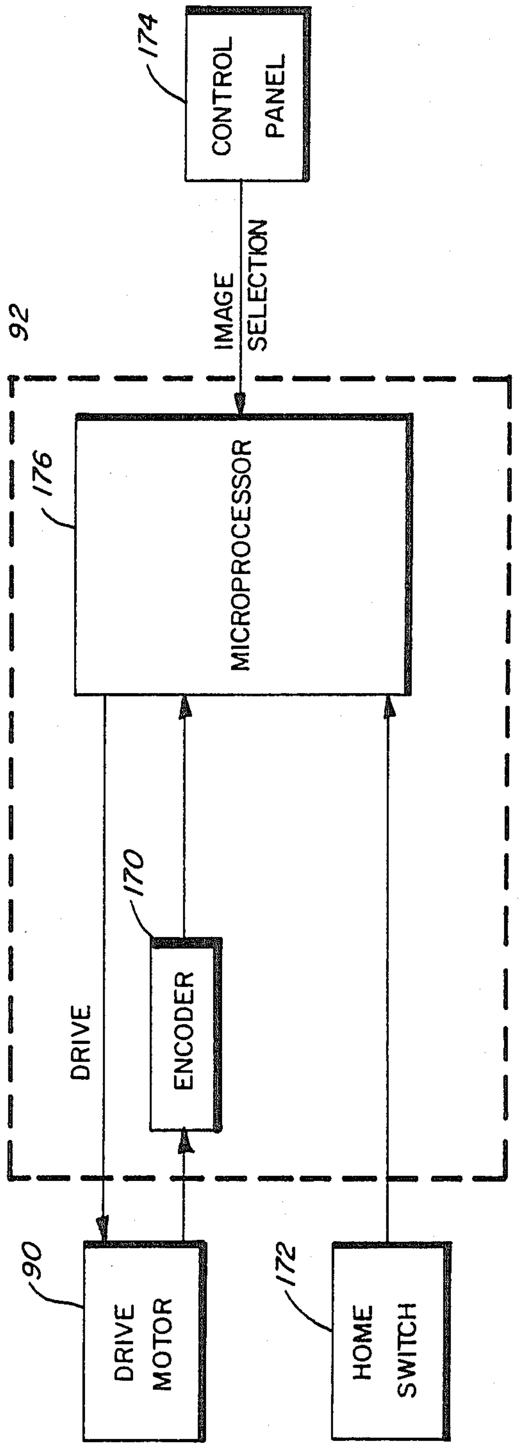

FIG. 6 is a schematic block diagram of the system control.

DESCRIPTION

General

Figure 1:
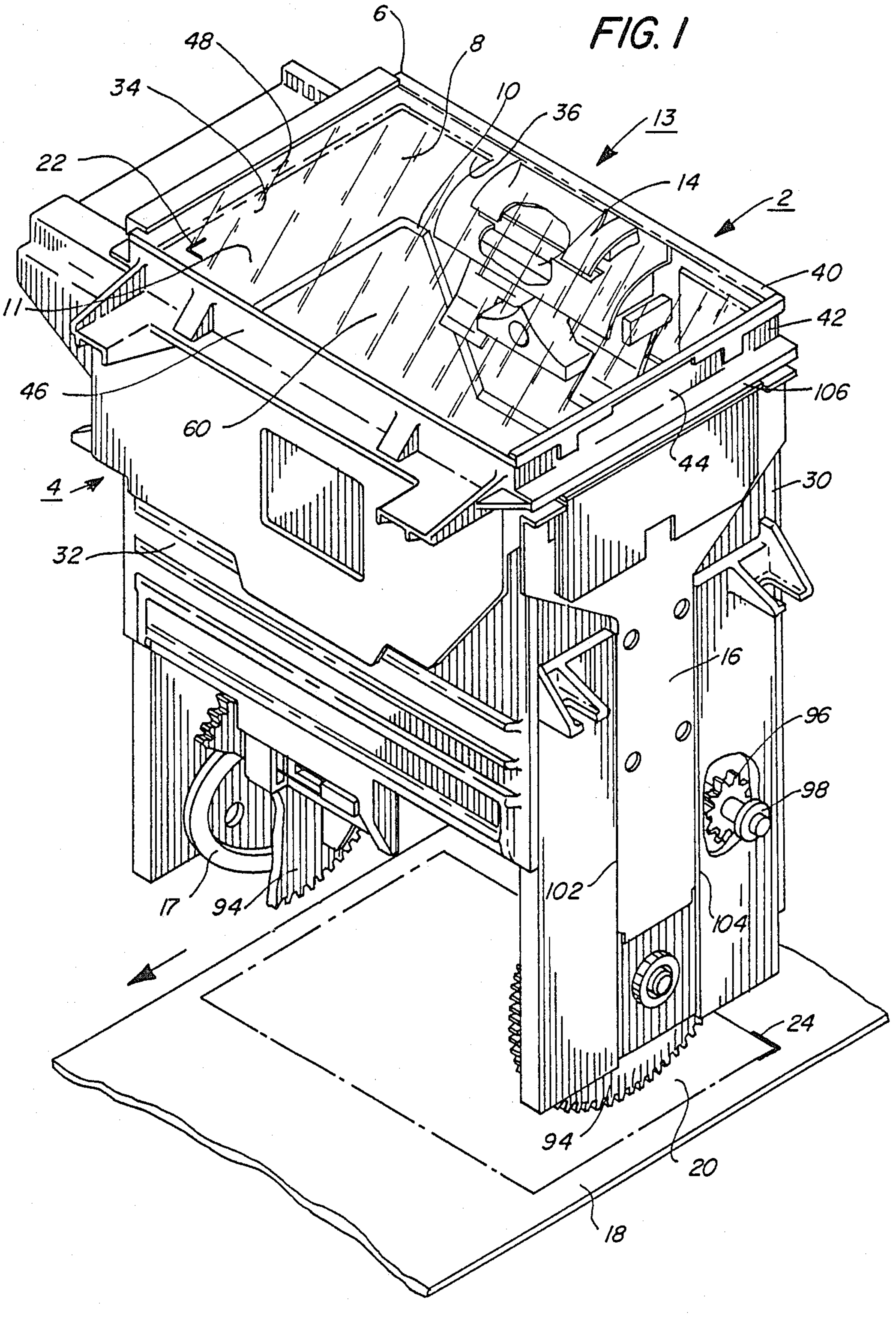
FIG. 1 is a perspective view of a document illumination and imaging system according to the invention.
Figure 2:
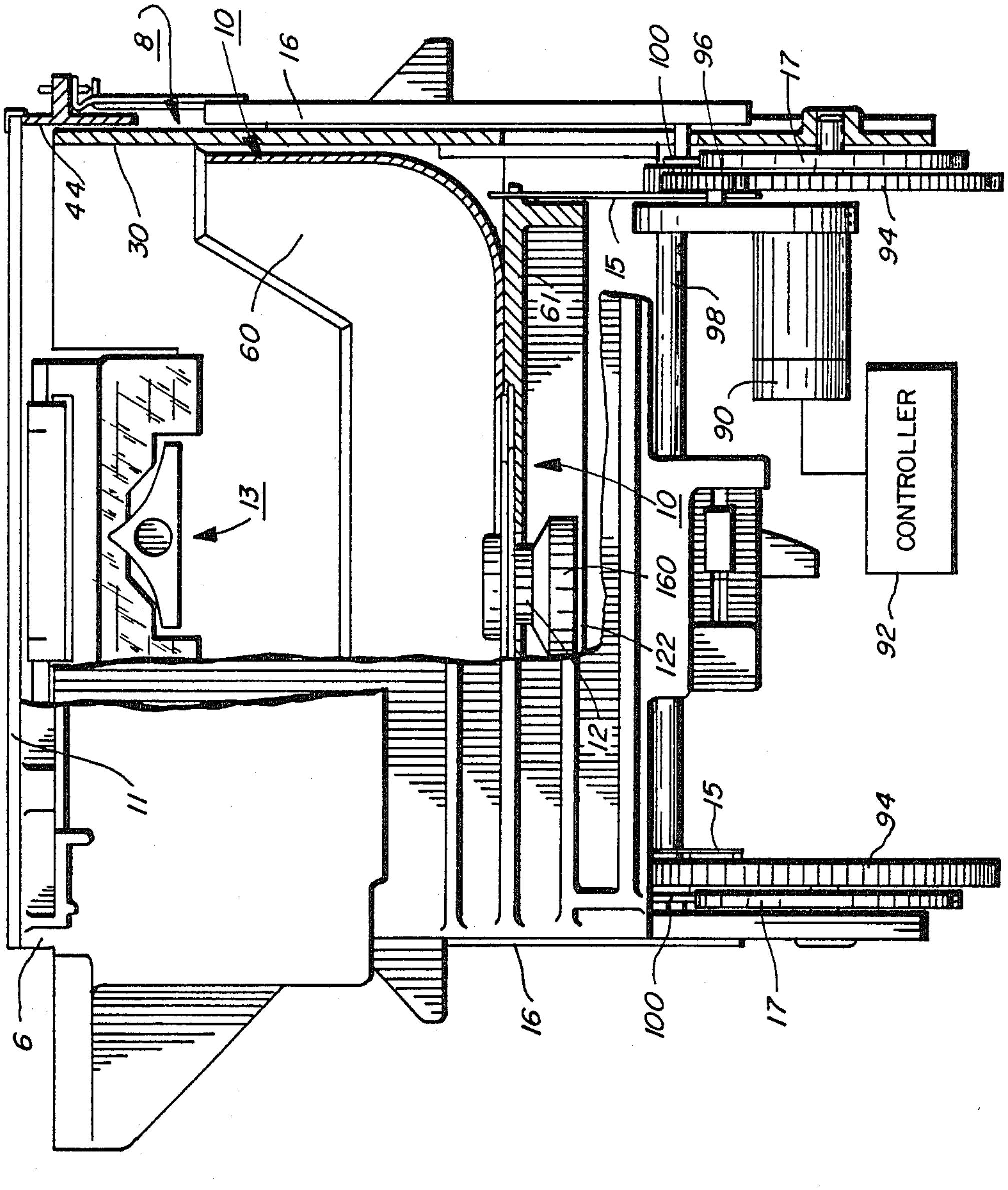
FIG. 2 shows a side sectional view of the light housing of FIG. 1.

Referring now to FIGS. 1 and 2 there is shown a preferred embodiment of a multi-magnification document illumination and imaging system 2. The system comprises a generally rectangular light housing 4 comprising a rectangular platen frame assembly 6 which is vertically movable along the outside surfaces of a rectangular, fixedly mounted, central frame member 8. Rectangular lens floor assembly 10 is also vertically movable along the inside surfaces of frame member 8. The top surface of the housing is defined by a transparent platen 11 seated in the top of platen frame assembly 6. A wide angle projection lens 12 (FIG. 2) is seated within the bottom surface of floor assembly 10. Within housing 4 and mounted on the inner surface of platen frame assembly 6, is an illumination assembly 13 which includes flash lamp 14 connected to a power source (not shown).

Vertical motion is imparted to the platen frame assembly 6 by a pair of vertically translatable, T-shaped bars 16. Each T-Bar is adapted, as described in detail below, to move the platen frame assembly to the necessary position dictated by the desired magnification. The lens floor assembly 10 is simultaneously translated by a crank arm 15 to the required position for the selected magnification. Thus, in a reduction mode, platen frame assembly 6 and floor assembly 10 move away from each other while, in an enlargement mode, both assemblies are translated upward. The platen assembly motions are defined by the magnification-dependent changes in overall conjugate associated with fixed focal length lens 12. Lens floor assembly 10 motion is related to the magnification-driven, object/image conjugate relationship. It is thus evident that the platen assembly 6 and lens floor assembly 10 move along the surfaces of fixed frame member 8, the volume and wall surface areas of housing 4 changes accordingly. Additionally, lens 12 is provided with a horizontal motion, in a manner described in detail below, which allows system 2 to maintain accurate corner registration for copying documents at all magnifications.

The general operation of illumination and imaging system 2 is as follows. A document to be copied is placed on platen 11, either manually or by means of an automatic document feeding device (not shown). Upon selection of a particular magnification within an exemplary system range of 0.647× through 1.55×, a pair of football shaped cams 17 are caused to rotate a prescribed distance. The cam rotation imparts vertical motion to T-Bars 16 and a crank motion to crank arm 15. These motions result in the platen frame assembly 6 and lens floor assembly 10 moving, respectively into their correct positions for that particular magnification. Lens 12 is moved horizontally, simultaneously with the vertical translation to maintain document registration by means described in detail below. Upon initiation of a print cycle, flash lamp 14 is energized and the document is uniformly illuminated by light reflected from the diffusely reflective interior walls of housing 4. The document image is projected through lens 12 upon a photoreceptor belt 18, moving in the indicated direction. Assuming the document being copied has $8\frac{1}{2}\times 11''$ dimensions, the exposed image area 20, for a 1X magnification, will be $8\frac{1}{2}\times 11''$. The document is corner registered at a platen registration guide mark 22 and this registration corner is projected onto belt 18 at corner 24. Concurrent with exposure, belt 18 continues to move in the indicated direction to bring the next unexposed portion of the belt into the exposure position. (An exemplary photoreceptor belt for use in the present system is disclosed in U.S. Pat. No. 4,265,990).

It will be appreciated that the document exposure system, as described above, forms one subsystem of a series of subsystems which may be combined within a single housing to form a complete multi-magnification copying system. The other system functions; e.g. photoreceptor charging, exposed image development, developed image transfer and photoreceptor cleaning, and the inter-related timing functions are well known in the art and hence are not set forth herein.

For ease of description, imaging and illumination system 2 is considered below in terms of three major functions: illumination, magnification and registration. There then follows a description of complete system operation in reduction and enlargement modes of operation.

ILLUMINATION

Figure 3:
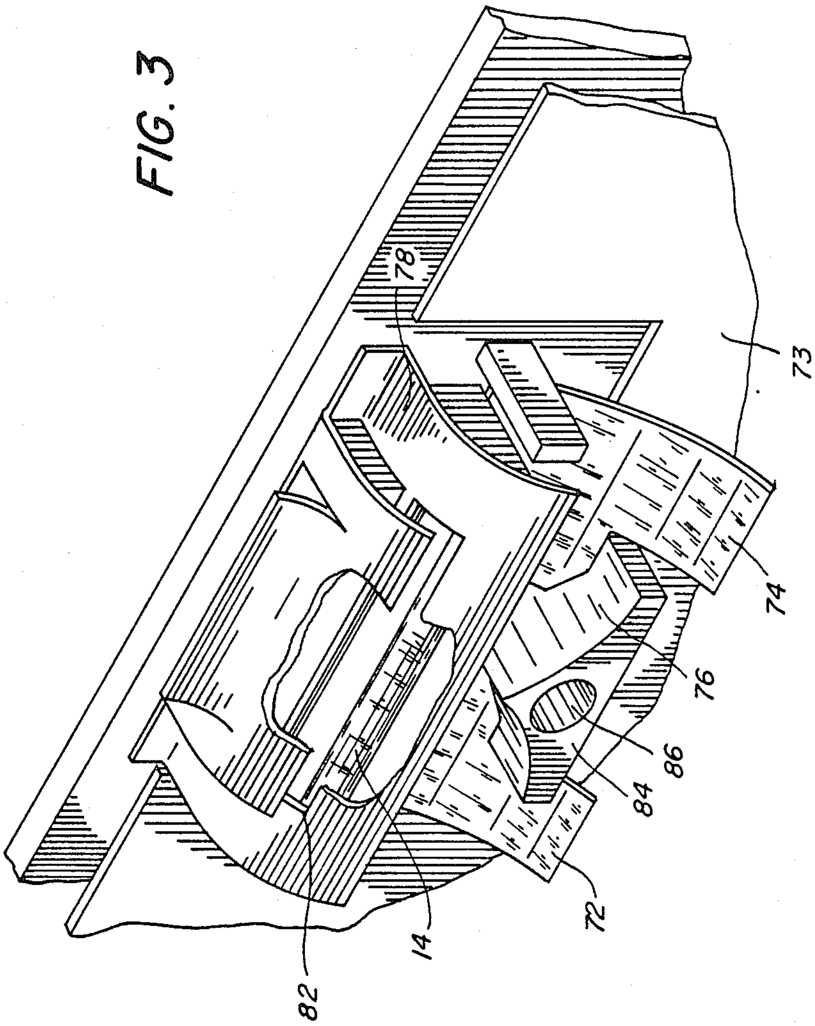
FIG. 3 shows the components comprising the illumination assembly of the present invention.

The function of the illumination subsystem is to collect the light energy from flash lamp 14 and distribute this energy so as to uniformly and diffusely illuminate a document placed on platen 11. This function is realized by utilizing a light housing 4 which is designed to operate as a highly efficient integrating cavity. Referring to FIGS. 1, 2 and 3, housing 4 is defined by generally rectangular fixed frame member 8, movable platen frame assembly 6 and movable lens floor assembly 10. The interior surface areas of the side walls of these assemblies that are visible at any given time will vary depending on the relative position of platen assembly 6 and lens floor assembly 10 as will be seen below. Frame member 8 is an integral structure having joined side walls 30, 32, 34 and 36. Platen frame assembly 6 contains platen 11 mounted within an aperture 40 of platen frame member 42. Platen frame member 42 is a generally rectangular integral unit having joined side walls 44, 46, 48 and 50. These side walls are slidably mounted adjacent the outside surfaces of adjacent fixed side walls 30, 32, 34, 36 and, during vertical translation, slide across an appropriate interposed material such as black fur seals which may be attached to either the moving or fixed walls. Platen 11 comprises a transparent glass member whose surface may be covered by an anti-reflective material, such as magnesium fluoride so as to minimize any platen-derived spectral reflection from entering the lens. In a normal copying mode, a platen cover (not shown) pivotably attached to the side of the housing, may be lowered to form a nearly light-tight cover over the document.

Lens floor assembly 10 comprises a lens frame member 60 seated over a lens carriage assembly 61 (visible in FIG. 5). Frame member 60 is a generally rectangular tub-like member having side walls 62, 64, 66 and 68. These side walls slope inwards towards a floor 70 having a lens aperture 71 therein. Frame member 60 is mounted so that its side walls slide over the adjacent inner surfaces of fixed walls 30, 32, 34, 36 during a vertical excursion. The same sealing material described above in connection with the platen frame member movement may be used to provide an interface between the lens frame member 60 and adjacent fixed side walls surfaces. Lens 12 is mounted for horizontal movement in a lens registration plate assembly 71 described in further detail below. Lens 12 is essentially flush with the surface of floor 70 thus minimizing light traps from areas adjacent of the lens.

From the above description, it will be evident that the total interior surface of housing 4 which is exposed to illumination from lamp 14, and hence the amount of illumination present at the bottom surface of platen 11 will depend upon the particular magnification selected and the position of the platen and lens assemblies 6, 10, after having completed their required vertical excursions. In other words, housing 4 interior surface area (and volume) will change as a function of magnification. In order to provide sufficient illumination to the underside of platen 11 housing 4 is designed to function as an integrating cavity. This is accomplished by coating all interior surfaces with a high (92% minimum) reflectivity material such as celanese polyester thermal setting paint No. 741-13. Interior surfaces which are so coated include interior walls of side wall member 8, platen frame member 42, lens frame member 60, floor 70 and all components visible to the lamp which surrounds lens 12. These coated surfaces are thus made diffusely reflective to light impinging therein. When lamp 14 is pulsed and caused to flash, light is directed against these coated surfaces, undergoing one or more reflections and illuminating the underside of the platen with a generally uniform level of illumination. The bottom surface of the platen cover and the white portions of the document also effectively form part of the housing since some light is reflected from their surfaces.

Flash lamp 14, in a preferred embodiment, is a linear xenon lamp which is fixedly secured to rear platen wall 50 of platen frame member 42 and therefore travels with member 42 through the vertical motions i.e. the lamp position relative to platen 11 remains fixed. The lamp is located outside the object-to-lens angular field so that the out-of-focus image of the lamp through the lens is outside the image format. The lamp is partially enclosed by specular reflectors 72, 74, 76 (FIG. 3) opaque blocker 78 and translucent blocker 80. The reflectors are elliptically shaped and designed to collect a portion of the lamp energy and direct it to facing interior housing surface areas in such a manner as to enhance the uniformity of illumination at the platen. A particular configuration for a reflector would be a molded plastic reflector assembly overcoated with aluminum. Blockers 78, 80 serve to protect an operator, in an open-platen copying mode, from direct flash light. Blocker 78 has aperture 82 therethrough to optimize the illumination level directly above the blockers. Additionally, the undersides of the blockers may be coated with a diffuse material so as to act as secondary illumination source.

Energy is applied to flash lamp 14 from a power supply (not shown). The power input is adjustable in response to the particular magnification (i.e. input increases in enlargement modes and decreases in reduction modes from a 1× level).

Under prolonged operating conditions, and for certain system applications, the interior of the housing may experience a temperature rise for which various cooling techniques may be employed. In the absence of a cooling mechanism, lamp 14 tends to heat the immediately adjacent air by radiative absorption and localized convective air flow currents. Blocker 78 tends to partially restrict convection heat flow away from the immediate lamp area. During operation, a natural convection heat flow cycle occurs within the housing. The heated air around lamp 14 flows up around blocker 80. After reaching the platen, the heated air flows across the bottom surface of the platen down the opposite wall surface, across housing floor 70 and back to lamp 14, thus completing a natural convection flow cycle.

To compensate for this heating condition, several mechanisms may be employed singly or in combination. In a first passive mechanism, a series of exit ports (not shown) may be located behind blocker 80 to eliminate some of the heated air near its source. A second, active, measure is to introduce a slightly pressurized ambient air flow into the cavity directing the air flow to the under surface of platen 11 immediately above lamp 14. This air flow tends to cool the heated platen surface while disrupting the natural convective heat flow cycle. The slight pressurization reduces the possibility that contaminants (e.g. toner from a development subsystem) will enter the housing through discontinuities in the cavity structure or through faulty seals. In combination with the first pressure mechanism, the air pressurization, associated with the active cooling, forces heated air out the exit apertures located near the flesh lamp.

As a final component to the illumination subsytem, document exposure is regulated by real time sensing of exposure conditions within the housing, and quenching of lamp 14 after an appropriate time interval. In an exemplary embodiment, a photosensor 84, located within an aperture 86 of reflector 76, senses illumination at the opposing housing wall surface and quenches lamp 14 by means of control circuitry (not shown). The control circuitry disclosed in U.S. Pat. No. 4,272,188 assigned to the same assignee as the present invention is suitable for this purpose.

MAGNIFICATION

The present illumination and imaging system enables the reproduction of documents at exemplary magnification values ranging from 0.647× to 1.55×. The lens, mounted on lens carriage assembly 61 is axially translated in combination with the document platen. The combined translation result in that the lens is positioned at the proper location for the required magnification and the platen at the proper position to adjust for the overall conjugate changes. Platen and lens motions are controlled by a mechanical drive system controlled by a relative position automatic control system.

Referring to FIGS. 1, 2 and 4, T-Bars 16 are driven in a vertical direction via a reversible permanent capacitor AC inductor gear motor 90 driven by signals from controller 92. Motor gear shaft 93 drive gears 94 which is mounted on fixed side wall 30. Cam 17 is mounted for rotation with gear 94. Gear 94 drives a second transfer gear 96 on transfer shaft 98. Cam 17 operates on T-Bars 16 via cam follower member 100. T-Bars 16 are slidably attached to ball-slides 102, 104 (FIG. 1) fixedly mounted in a channel between fixed side wall 30 and the interior surface of the T-Bar. The upper T-portion of bar 16 is fixedly mounted to projecting flange 106 of platen frame assembly 6. Cam 17 serves a dual purpose: it drives T-Bar 16 so as to move platen assembly 6 to the position necessary to compensate for conjugate length changes and it also serves, via a linkage mechanism, to drive lens floor assembly 10 to the required magnification position.

Cam 17 operates on lens floor assembly 10 by means of a crank arm 15 attached to bushing 108 which, in turn, if fixedly mounted to both cam 17 and gear 96. Crank arm 15 is also attached to lens carriage assembly 61. As cam 17 rotates, the bushing described an harmonic motion producing a corresponding crank motion in arm 15. The arm, in turn, provides the force to slide lens floor assembly 10 vertically past the surfaces of central frame member 8.

FIG. 4*a*, 4*b*, 4*c* shows, in schematic form, the relative orientation of cam 17 at magnifications of 0.647×, 1× and 1.55×; respectively. Examining first FIG. 4*b*, cam 17 is in a horizontal position with its maximum axis essentially parallel with the plane of the floor assembly 10. In FIG. 4*a*, cam 17, in response to a reduction print signal, has been rotated in a clockwise direction, dropping floor assembly 10 to its lowest possible position and causing platen assembly 6 to rise to its highest possible position. The volume and wall surface area of housing 4 are greatest at this position. In FIG. 4*c*, cam 17 has been rotated so that bushing 108 is at its highest point, raising floor assembly 10 to its maximum height. Platen assembly 6 is also raised to its maximum height. The volume and wall surface area of housing 4 are least at this position.

Interim positions of cam 17, of course, provide magnification ranges between the two extremes. A gear ratio of 105/18 (gear 98/116) provides adequate continuous magnification values within the imposed limits.

A similar T-Bar, crank and cam assembly is located on the left side of the housing. Angular symmetry between the two T-Bars is maintained by means of gears 96 driving shaft 98 (FIG. 1). A second transfer gear is attached to shaft 98 on the left side of the housing.

Referring to FIG. 5, there is shown an exploded view of the lens frame member 60 and lens carriage assembly 61. Lens 12 is mounted within an aperture 110 formed within horizontal plate 112. A first baffle 114 having an aperture 116 is seated on plate 112, the aperture 116 accommodating lens 12. A second baffle 118 having an aperture 120 is positioned over first baffle 114. The baffles may be made of a diffusely reflecting white plastic or have a diffusely reflective surface coating. When both baffles 114, 116 are mounted in operative position beneath aperture 71 the top surface of lens 12 is essentially in the same plane as floor 70 thus minimizing light traps from areas adjacent to the lens. Plate 112, with seated lens 12 and baffle 114, is slidingly engageable with baffle 118 in a horizontal direction by means described below. Lens 12 is therefore movable, horizontally within the confines of aperture 116 (coincident with aperture 120).

Lens plate 112 is seated within aperture 122 of carriage frame 124. The plate is adapted to move along V-groove 126 and anti-rotation pad 128 by means of a cable. The V-groove is parallel with the diagonal of a B-4 document registered on the platen through registration corner 22. The cable is entrained about pulley drive system 130. System 130 is designed to conform the horizontal position of the lens with its vertical motion to prescribe a generally diagonal lens path. (The lens diagonal path is aligned with the diagonal of a B-4 original document through registration corner 22.) The diagonal path is adjusted by means of cam 132 to provide a corner registration at all magnifications. One end of a cable 134 is fixedly attached to a tab 136 mounted on plate 112. The cable is entrained over a first pulley 138 and over a second pulley 140, both mounted on carriage 124, and a third pulley 142 mounted on side wall 36. The other end of cable 134 is connected to a slider 144 adapted to slide a short distance along slot 146 mounted on wall 36. A cam follower 148 is attached to slider 144. Cam follower 148 rides along the surface of cam member 132 which is fixed to the side of carriage frame 124. The movement of slider 144 and cam follower 148 by cam 132 changes the cable position to correct lens motion from a 45° path in space which a fixed cable would produce, to the curved path resulting from cam 132 surface which results in the maintenance of corner registration at all magnifications.

In operation, lens carriage assembly 61 is moved in a vertical direction by means of the mechanism previously described. As the carriage changes its vertical position, the vertical component of motion is translated into a horizontal component of motion for lens plate 112 by means of the cable assembly/slider arrangement. If cam 132 had a linear vertical orientation, the horizontal diagonal member of the lens would also be linear. Because of the curved surface of cam 132 however, the lens describes a curved path through space. The shape of the cam surface is predesigned for the particular system so as to maintain lens 12 in the proper registration preset through any magnification. Spring 150 is mounted to tab 136 and to a fixed point on carriage 112 and provides appropriate cable tension for the plate movement. Adjustment cam 152 fits within a slot of cam 132 and is used during initial alignment of a system to pivot cam 132 into the proper position to compensate for focal length tolerances.

Relative Illumination Filter

In order to ensure a uniform exposure at photoreceptor belt 18, a relative illumination filter 160 (FIG. 2) is fixedly mounted below lens 12. The center of the filter is aligned with the center of the lens and the XY plane of the filter is perpendicular to the center line. The filter comprises a circular glass plate having most of its surface covered by a circular coating of varying density with a transparent ring along its outer edge. The density of the coating is maximum in the center of the plate and decreases with increasing radial distance from the center. The filter is designed to compensate for the well known phenomenon of $\cos^4$ falloff of light through the lens as well as lens exit pupil distortion which increases with increasing field angles. An exemplary filter is disclosed in U.S. Pat. No. 4,298,275, assigned to the same assignee as the present invention.

An occluder plate 162 is also mounted below the filter to crop the image at belt 18 so that the image assumes the general outline shown in FIG. 1 and to reduce excessive stray light.

Drive Control System

As generally described above, the movements of the platen and lens during a magnification change are under the control of controller 92. As shown in FIG. 6, a feedback encoder 170 is connected to the motor 90. Encoder 170 is a two-phase, Hall-effect, square wave generator which is switched by a magnet attached to the motor. Each phase generates one square wave cycle per motor revolution (i.e. 360°) and a displacement of 90° to allow direction encoding as well as displacement encoding. These encoder pulses are produced continually while motor 90 is rotating to provide relative position information for both platen and lens floor assemblies. A home position switch 172 is held open by an actuator attached to the lens floor assembly for all image sizes less than 1.03× and closed for all images greater than 1.03×. The inputs of encoder 170 and switch 172, together with an input from the control panel 174 indicative of the magnification selection are decoded and compared in microprocessor 176. When a magnification change is selected, microprocessor 176 receives the representatives signal from control panel 174, compares the signal to the present location of the platen and lens, determines the direction of motor 90 rotation, turns on motor power, updates the location counter from the encoder data and steps the motor when the required positions for the selected magnification are determined. An alternative drive system which may be adapted for use in the present system is disclosed in U.S. Pat. No. 4,316,668 wherein a platen and lens are driven to their registration magnification position under the control of a microprocessor controller.

Operation In 1× and Magnification Modes

An operational cycle will now be described wherein a document is copied at a 1× magnification then at a 0.647× magnification and then at 1.55× enlargement.

Referring to FIG. 1, a document is placed so that its corner is registered at registration mark 22. The operator will push the appropriate print button applying power to lamp 14. The lamp provides a flash of light which undergoes multiple reflections from all interior surfaces of housing 4 to provide a nominally uniform level of illumination to the document. Sufficient light is reflected from the document and passes through lens 12 onto photoreceptor belt 18 to form a latent document image area 20 of the same dimensions as the documents. Belt 18 continues to move, advancing the next unexposed area.

To enable a 0.647× reduction mode, the lens must move towards the photoreceptor and the object and image conjugates must be adjusted for the particular magnification. These objectives are accomplishment by moving platen frame member 8 to its maximum extended position by means of the T-Bar translation mechanism described above and by moving lens carriage assembly 61 downward by means of the T-Bar linkage mechanism described above and by moving lens horizontal plate 74 along the full length of the nonlinear path defined above.

Upon selection of the 0.647× reduction mode, platen frame member 8 begins to be moved in a vertical direction, sliding past the fixed side walls as cam followers 104 move along the surface of cam 100. Cam 100 as shown in FIG. 4*a* assumes a fully vertical end-to-end position at the 0.647× position. At this position, platen frame member 8 is at its maximum upward excursion. Simultaneously, linkage arm 110, rotating with cam 100, causes the lens carriage assembly 61 to move in a downward direction again sliding along light sealed side walls. As shown in FIG. 4*a* lens 12 is at its maximum downward excursion. At this magnification position the surface area and volume of housing 4 are both maximum.

Lens 12 has maintained corner registration by moving to the right coincident with its vertical descent. The vertical motion is translated into a horizontal lens motion by action of cam slider assembly, or modified by the motion of follower 110 along the surface of cam 92.

Assuming the next magnification value chosen is 1.55×, cams 100 are rotated approximately 160° to the position shown in FIG. 4*c*. At this position, platen frame member 8 is again driven to its maximum upward position while lens frame carriage 61 is driven to its maximum upward position. At this magnification the volume and surface area of housing 4 are at a minimum. According to one of the features of the present invention the efficiency of the illumination increases as the volume of the cavity housing decreases. This efficiency gain enables magnification of greater than 1.0× without requiring modification to the power supply function or design.

Magnification values between 0.647× and 1.55× are, of course possible, coincident with any intermediate position of cams 100.

In conclusion, it may be seen that there has been disclosed a novel optical imaging system. The exemplary embodiments described herein are presently preferred, however, it is contemplated that further variations and modifications within the purview of those skilled in the art can be made herein. The following claims are intended to cover all such variations and modifications as fall within the spirit and scope of the invention.

What is claimed is:

1. An imaging system for providing, at an image plane, reduced and enlarged images of a document lying in an object plane comprising:

an enclosed light housing which includes a vertically translatable transparent platen assembly forming the top surface thereof and a vertically translatable floor assembly forming the bottom surface thereof, a projection lens mounted in an aperture of said floor assembly, means for simultaneously changing the position of said platen assembly and said floor assembly in response to a particular magnification selection, flash illumination means within said housing to provide substantially uniform illumination of said platen; and lens registration means for providing a horizontal component of motion to said lens simultaneously with said vertical lens movement to maintain corner registration of said document at the imaging plane including a horizontal lens carriage having the lens mounted thereon, and cable drive means adapted to drive said lens carriage in a horizontal direction so as to change the position of said lens in said floor assembly aperture.

2. The imaging system of claim 1 wherein said cable drive means includes a registration cam in fixed position on said housing, a slider mechanism connected to one end of said cable drive, said slider mechanism having mounted thereon a cam follower member which cooperates with said registration cam to modify the path of travel of said lens carriage.

* * * * *

UNITED STATES PATENT AND TRADEMARK OFFICE
CERTIFICATE OF CORRECTION

PATENT NO. : 4,530,592

DATED : July 23, 1985

INVENTOR(S) : Frederick A. Green, et al

It is certified that error appears in the above-identified patent and that said Letters Patent are hereby corrected as shown below:

Col. 4, line 45, change "walls" to --wall--.

Col. 4, line 50, replace "of" with --to--.

Col. 6, line 22, after "result", replace "in" with --is--.

Col. 6, line 31, replace "drive gears" with --drives gear--.

Col 6, line 48, replace "if" with --is--.

Col 6, line 50, replace "described" with --describes--.

Col. 8, line 53, change "representatives" to the singular form.

Col. 9, line 16, change "accomplishment" to --accomplished--.

Signed and Sealed this

*Twenty-fifth* Day of *March 1986*

[SEAL]

*Attest:*

DONALD J. QUIGG

*Attesting Officer* *Commissioner of Patents and Trademarks*